United States Patent
Blessing

(10) Patent No.: US 8,955,412 B2
(45) Date of Patent: Feb. 17, 2015

(54) HYBRID DRIVETRAIN

(75) Inventor: Uli Christian Blessing, Heilbronn (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 212 days.

(21) Appl. No.: 13/571,649

(22) Filed: Aug. 10, 2012

(65) Prior Publication Data
US 2013/0036863 A1 Feb. 14, 2013

(30) Foreign Application Priority Data

Aug. 11, 2011 (DE) .......................... 10 2011 110 444

(51) Int. Cl.
*F16H 37/06* (2006.01)
*B60K 6/40* (2007.10)
*B60K 6/48* (2007.10)
*B60K 6/547* (2007.10)

(52) U.S. Cl.
CPC ... *B60K 6/40* (2013.01); *B60K 6/48* (2013.01); *B60K 6/547* (2013.01); *Y02T 10/6221* (2013.01); *Y02T 10/626* (2013.01); *B60K 2006/4808* (2013.01)
USPC .......................................... 74/661; 74/665 B

(58) Field of Classification Search
CPC ...................................................... F16H 1/22
USPC .......................... 74/661, 665 R, 665 A, 665 B
See application file for complete search history.

(56) References Cited

U.S. PATENT DOCUMENTS

| | | | |
|---|---|---|---|
| 5,562,565 A | 10/1996 | Moroto et al. | |
| 6,341,541 B1* | 1/2002 | Sakamoto et al. | 74/665 A |
| 6,712,734 B1* | 3/2004 | Loeffler | 477/5 |
| 7,150,698 B2* | 12/2006 | Sakamoto et al. | 477/5 |
| 7,670,256 B2* | 3/2010 | Winkelmann et al. | 477/5 |
| 2002/0065163 A1 | 5/2002 | Deichl et al. | |
| 2002/0084118 A1 | 7/2002 | Esaki | |
| 2004/0048710 A1 | 3/2004 | Tumback | |
| 2005/0101432 A1* | 5/2005 | Pels et al. | 477/5 |

(Continued)

FOREIGN PATENT DOCUMENTS

| | | | |
|---|---|---|---|
| DE | 198 50 549 A1 | 5/2000 | |
| DE | 199 60 621 A1 | 6/2001 | |

(Continued)

OTHER PUBLICATIONS

European Search Report for Application No. 12179610.6, dated Nov. 20, 2012 in 5 pages.

(Continued)

*Primary Examiner* — Ha D Ho
(74) *Attorney, Agent, or Firm* — Knobbe Martens Olson & Bear, LLP

(57) ABSTRACT

A hybrid drivetrain for a motor vehicle has an internal combustion engine, an electric machine, and a transmission arrangement for setting at least two different gears. The internal combustion engine and the electric machine are coupled to an input element of the transmission arrangement. A differential is coupled to an output of the transmission arrangement and is adapted to distribute motive power to two drive shafts. The electric machine and the internal combustion engine are coupled to a transmission input shaft of the transmission arrangement by way of a spur gear train.

23 Claims, 1 Drawing Sheet

(56) References Cited

U.S. PATENT DOCUMENTS

| | | |
|---|---|---|
| 2007/0175723 A1 | 8/2007 | Blessing et al. |
| 2009/0205886 A1 | 8/2009 | Supina et al. |
| 2010/0311540 A1* | 12/2010 | Hellenbroich ............... 477/5 |
| 2011/0167956 A1 | 7/2011 | Holmes et al. |

FOREIGN PATENT DOCUMENTS

| | | |
|---|---|---|
| DE | 201 18 908 | 3/2002 |
| DE | 199 17 724 C2 | 1/2003 |
| DE | 102 41 457 A1 | 3/2004 |
| DE | 10 2004 045 932 A1 | 4/2005 |
| DE | 10 2005 063 248 A1 | 7/2007 |
| DE | 10 2010 063 092 A1 | 6/2011 |
| WO | WO 2010/063735 | 6/2010 |
| WO | WO 2012/079683 A2 | 6/2012 |

OTHER PUBLICATIONS

German Search Report for Application No. 10 2011 110 444.9 dated Oct. 14, 2013.

* cited by examiner

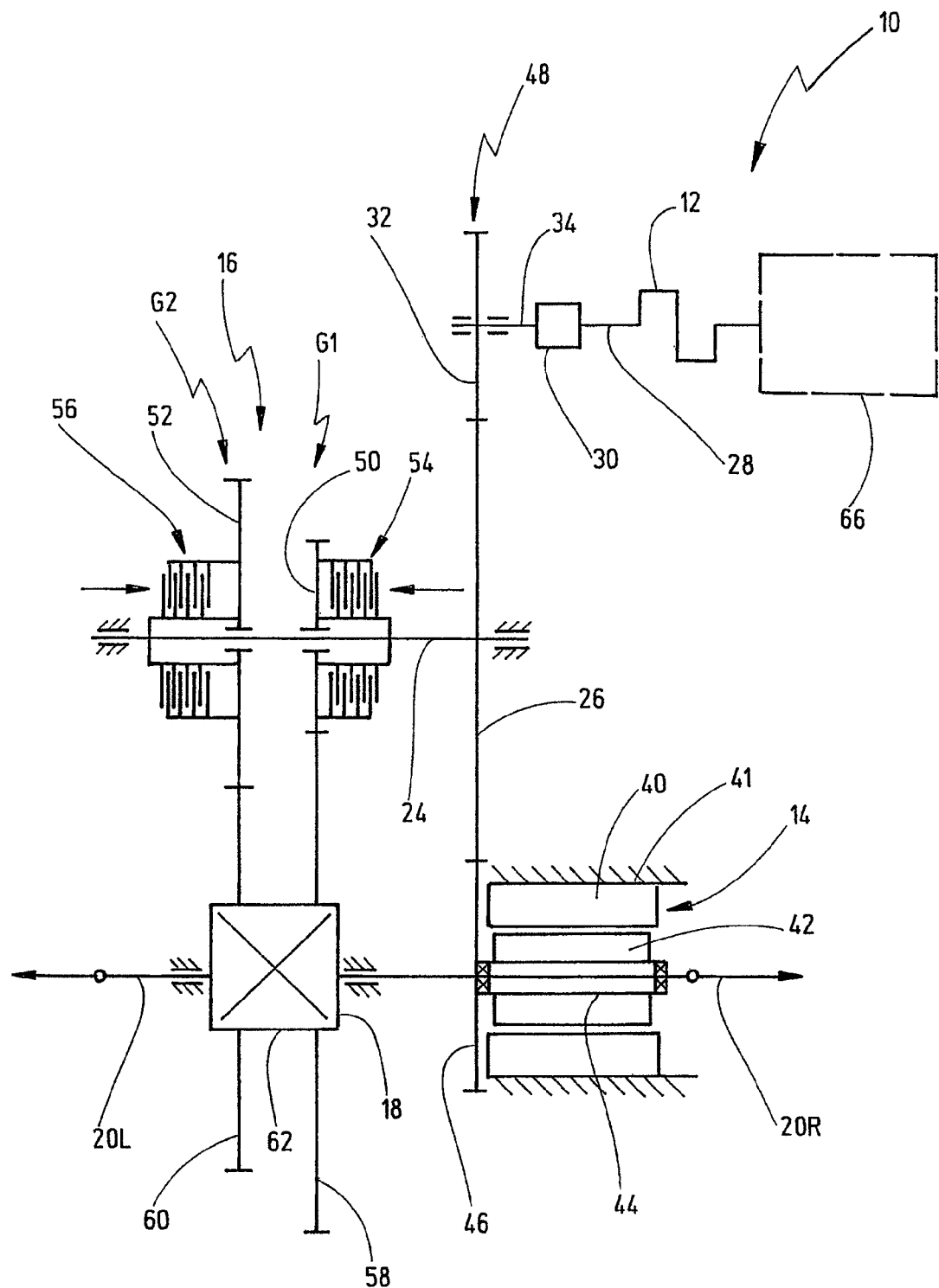

HYBRID DRIVETRAIN

CROSS-REFERENCE TO RELATED APPLICATIONS

This application claims the priority of German patent application DE 10 2011 110 444, filed Aug. 11, 2011.

BACKGROUND OF THE INVENTION

The present invention relates to a hybrid drivetrain for a motor vehicle, having an internal combustion engine, an electric machine, a transmission arrangement for setting at least two different gears, the internal combustion engine and the electric machine being coupled to an input element of the transmission arrangement, and having typically a differential, which is coupled to an output of the transmission arrangement and which is adapted to distribute motive power to two drive shafts.

In a drivetrain known from WO 2010/063735 A1, the electric machine is arranged coaxially with the internal combustion engine. The transmission arrangement is formed by a planetary transmission.

A similar drivetrain is disclosed by the document U.S. Pat. No. 5,562,565, in which the internal combustion engine is connected to the input element of the transmission arrangement by way of a hydrodynamic converter and a clutch.

The document DE 20 118 908 U1 furthermore discloses a hybrid drivetrain, in which an internal combustion engine is connected to a differential by way of a first transmission. An electric machine is connected to the differential by way of a second transmission.

BRIEF SUMMARY OF THE INVENTION

Against this background, an object of the invention is to specify a hybrid drivetrain, which is cost-effective to produce and/or of compact construction.

In a hybrid drivetrain as described above, the aforementioned object is achieved in that the electric machine and the internal combustion engine are coupled to a transmission input shaft of the transmission arrangement by way of a spur gear train.

In the hybrid drivetrain according to the invention the internal combustion engine and the electric machine can be coupled to the transmission input shaft of the transmission arrangement by simple design means, that is to say by means of a preferably single spur gear train. The internal combustion engine and the electric machine can thereby be arranged in parallel with one another (that is to say non-coaxially). This allows the electric machine and the internal combustion engine to be arranged at least partially overlapping in an axial direction (which here is preferably defined as a direction running transversely to a vehicle longitudinal direction).

Furthermore the internal combustion engine and the electric machine can preferably be arranged on the same side of the differential in an axial direction.

The hybrid drivetrain according to the invention is here designed to drive a vehicle either purely by means of an electric motor, purely by means of an internal combustion engine or by means of an internal combustion engine and an electric motor combined.

The transmission arrangement can preferably be shifted into a neutral position, so that the internal combustion engine can charge the electric machine even when the vehicle is stationary.

The object is therefore achieved in full.

According to an especially preferred embodiment the spur gear train comprises a first gearwheel, which is fixedly connected to the transmission input shaft and which meshes with a second gearwheel assigned to the electric machine and with a third gearwheel assigned to the internal combustion engine.

In this embodiment the spur gear train may be constructed using only three gearwheels, in order to connect the internal combustion engine and the electric machine to the transmission input shaft.

According to a further preferred embodiment a crankshaft of the internal combustion engine is coupled to the third gearwheel by way of a coupling device.

This allows the internal combustion engine to be decoupled from or connected to the third gearwheel. When the vehicle is being driven purely by the electric motor, the internal combustion engine is preferably decoupled from the third gearwheel by the coupling device, in order that the electric machine does not have to sustain the drag of the internal combustion engine.

According to an especially preferred embodiment the coupling device here is formed by a free-wheel (one-way clutch).

In this embodiment it is possible to selectively engage the internal combustion engine whilst the vehicle is being operated purely by the electric motor, the rotational speed converging, through use of the free-wheel, towards the rotational speed of the electric machine.

The internal combustion engine is furthermore capable of sustaining the drag of the electric machine. When the vehicle is being driven purely by the internal combustion engine, motive power can consequently be tapped off for charging the electric machine, which in this case is operated as an alternator. The drivetrain according to the invention is particularly suitable as a range-extender drivetrain, in which the vehicle can be operated predominantly by the electric motor, for example in urban traffic, whereas in prolonged interurban travel motive operation is possible purely by means of the internal combustion engine, in which case an electrical energy storage device for the electric machine is additionally charged by operation of the alternator described above.

The free-wheel is furthermore preferably of shiftable design. This preferably means that it is possible to shift the free-wheel over by means of an actuator, for example from a free-wheel mode into a rigidly coupled mode.

It is further preferred overall if the electric machine is arranged coaxially with one of the drive shafts.

In this embodiment it is possible to achieve an especially compact construction of the drivetrain in a radial direction.

It is further preferred if a motor shaft of the electric machine is fixedly connected to the second gearwheel.

In this embodiment the drag of the rotor of the electric machine is always sustained whilst the vehicle is being driven by the internal combustion engine. When the electrical storage device is fully charged, the electric machine here can be switched to an electrical no-load operation, so that the rotor can rotate substantially without losses.

According to a further embodiment, which is preferred overall, a first idler and a second idler, which can be shifted by way of respective clutches, are rotatably supported on the transmission input shaft.

In this embodiment the first idler is assigned to a first gear and the second idler to a second gear.

The two clutches can preferably each be shifted into a neutral position, so that the transmission arrangement as a whole can be shifted into a neutral position. The two clutches may be embodied as conventional shifting clutches in the form of dog clutches or in the form of synchronous shifting clutches.

It is particularly advantageous, however, if the clutches are embodied as power-shift clutches.

In this embodiment the clutches may be embodied, for example, as wet multi-plate clutches. In this case it is possible to perform an overlapping gear change, in such a way that gear changes can be performed substantially without any interruption of tractive force.

However, dry friction clutches are also feasible as power-shift clutches.

It is furthermore advantageous overall if an input element of the differential is fixedly connected to a first driving gear and a second driving gear, which mesh with the first idler and the second idler, respectively.

In this embodiment the two gears are achieved in a radially compact form in that a gear train comprising an idler and a fixed gear is assigned to each gear, the fixed gears being formed by the respective driving gears, which are fixedly connected to the input element of the differential (in the nature of toothed rims).

In the drivetrain according to the invention the electric machine can be run by way of at least two, preferably exactly two shifted gears, particularly in the form of two loose "final drives". When the transmission arrangement is shifted into the neutral position, the electric machine can be charged by means of the internal combustion engine whilst the vehicle is stationary. Furthermore, charging of an electrical energy storage device is likewise possible whilst the vehicle is being propelled by the internal combustion engine, in order to afford a "range extension". Furthermore the internal combustion engine can also be selectively engaged and switched off separately by way of a shiftable free-wheel. The facility thereby exists for synchronizing the rotational speed of the internal combustion engine and the rotational speed of the transmission input shaft by means of the electric machine, without having to constantly sustain the drag of the internal combustion engine when the vehicle is being propelled electrically. Furthermore the internal combustion engine can be started by way of the electric machine, the drag of the internal combustion engine being sustained at least up to an idling speed. In this case the transmission arrangement is shifted into the neutral position whilst the vehicle is stationary or rolling ("sailing").

The features specified above and yet to be explained below can naturally be used not only in the particular combination indicated but also in other combinations or in isolation, without departing from the scope of the present invention.

BRIEF DESCRIPTION OF THE SEVERAL VIEWS OF THE DRAWING

Exemplary embodiments of the invention are represented in the drawing and are explained in more detail in the following description. In the drawing:

FIG. 1 shows a schematic longitudinal section through an embodiment of a drivetrain according to the invention.

DETAILED DESCRIPTION OF THE INVENTION

An embodiment of a hybrid drivetrain is represented schematically in longitudinal section in FIG. 1 and is denoted by 10.

The drivetrain 10 comprises an internal combustion engine 12, an electric machine 14, a transmission arrangement 16 and a differential 18. The internal combustion engine 12 and the electric machine 14 are connected to an input element of the transmission arrangement 16. An output of the transmission arrangement 16 is connected to the differential 18. Electrical motive power or that from an internal combustion engine is therefore transmitted by way of the input element of the transmission arrangement, the transmission arrangement 16 and the differential 18 to drive shafts 20L, 20R, which are preferably connected to driven wheels of an axle of the motor vehicle. In an alternative embodiment the drive shafts 20L, 20R may also be connected to different axles of the motor vehicle.

The hybrid drivetrain is designed to drive the vehicle either purely by means of an electric motor, purely by means of an internal combustion engine or by means of an electric motor and an internal combustion engine combined.

The transmission arrangement 16 comprises a transmission input shaft 24, which is rotationally fixed to an input gearwheel 26 in the form of a spur gear. A crankshaft 28 of the internal combustion engine 12 is connected to a first drive gearwheel 32 by way of a schematically indicated coupling device 30. More precisely, the first drive gearwheel 32 is rotationally locked to a shaft portion 34, which is preferably aligned coaxially with the crankshaft 28. The first drive gearwheel 32 is likewise embodied as a spur gear and meshes with the input gearwheel 26.

The electric machine 14 comprises a stator 40, which is connected to a schematically indicated housing 41 of the drivetrain 10 and/or to a body of the vehicle. The electric machine 14 further comprises a rotor 42. The rotor 42 is connected to a rotor shaft 44, which is embodied as a hollow shaft. The rotor shaft 44 is arranged coaxially with one of the drive shafts (in this case the drive shaft 20R), in such a way that the drive shaft 20R is led through the rotor shaft 44. Here the rotor shaft 44 is supported by means of bearings, not further described, so that it can rotate in relation to a portion of the drive shaft 20R. The rotor shaft 44 is furthermore connected to a second drive gearwheel 46, which is likewise embodied as a spur gear and meshes with the input gearwheel 26.

The input gearwheel 26, the first drive gearwheel 32 and the second drive gearwheel 46 together form a spur gear train 48.

The transmission arrangement 16 comprises a first idler 50 and a second idler 52. The idlers 50, 52 are rotatably supported on the transmission input shaft 24. The transmission arrangement 16 further comprises a first clutch 54 and a second clutch 56. The first clutch 54 is designed to connect the first idler 50 to the transmission input shaft 24 or to separate it therefrom. The second clutch 56 is correspondingly designed to connect the second idler 52 to the transmission input shaft 24 or to separate it therefrom. The clutches 54, 56 are in each case designed as power-shift clutches, for example as wet multi-plate clutches, and can be automatically actuated by means of actuators, which are in each case not further described but indicated by an arrow.

The transmission arrangement 16 further comprises a first driving gear 58, which meshes with the first idler 50, and a second driving gear 60, which meshes with the second idler 52. The driving gears 58, 60 are each rotationally fixed to an input element (for example a differential housing) 62 of the differential 18 and arranged coaxially with the drive shafts 20L, 20R.

The first idler 50 and the first driving gear 58 form a first gear train of a first gear G1. The second idler 52 and the second driving gear 60 form a second gear train of a second gear G2.

The coupling device 30 may be embodied as a clutch, but is preferably embodied as a free-wheel, in particular a shiftable (loose) free-wheel.

The drivetrain 10 is embodied as a range-extender drivetrain. In normal motive operation the vehicle equipped therewith is driven purely by electric motor by means of the electric machine 14, either by way of the first gear G1 or by way of the second gear G2. Here the coupling device 30 is opened, so that the drag of the internal combustion engine 12 does not have to be sustained in this operating mode. In this case it is possible, through overlapping actuation of the clutches 54, 56, to perform gear changes without any interruption of tractive force (in a similar way to dual clutch transmissions).

The drivetrain is furthermore designed for driving purely by internal combustion engine. Here motive power from the internal combustion engine is fed to the differential 18 either by way of the first gear G1 or the second gear G2. In this operating mode the drag of the rotor 42 of the electric machine 14 is generally sustained. Where an electrical energy storage device, connected to the electric machine 14 (and not represented in more detail), is to be charged, it is possible in this operating mode to tap motive power off from the internal combustion engine to the electric machine 14, which then functions as an alternator and charges the electrical energy storage device.

Alternatively or in addition, it is also possible to connect the internal combustion engine 12 to a further electric machine, which is embodied as an alternator 66.

If the electrical energy storage device is charged, the electric machine 14 may be run in no-load operation, so that it constitutes only a relatively low drag torque. Furthermore when the vehicle is being operated by the internal combustion engine the electric machine 14 may also be used for boost purposes, in order thus to make electrical motive power available in addition to the motive power of the internal combustion engine.

If the two clutches 54, 56 are both opened, the electric machine 14 is able to start the internal combustion engine. This can be done when stationary or whilst the vehicle is rolling (sailing). Furthermore, with the clutches 54, 56 opened, the internal combustion engine 12 is capable of charging an electrical energy storage device by way of the electric machine 14 even when stationary.

The following modifications of the aforementioned embodiment are possible, for example.

The electric machine 14 need not necessarily be arranged coaxially with one of the drive shafts, but may also be integrated in the drivetrain in some other way.

Here the internal combustion engine 12 and the electric machine 14 are each connected to the spur gear train 48 from the same axial side. It is also possible, however, for the internal combustion engine 12 and the electric machine 14 to be connected to the spur gear train 48 from different axial sides.

The clutches 54, 56 may also be embodied as simple dog clutches or as synchronous shifting clutches.

What is claimed is:

1. Hybrid drivetrain for a motor vehicle, having
an internal combustion engine;
an electric machine;
a transmission arrangement for setting at least two different gears, the internal combustion engine and the electric machine being coupled to an input element of the transmission arrangement; and
a differential, which is coupled to an output of the transmission arrangement and which is adapted to distribute motive power to two drive shafts,
wherein the electric machine and the internal combustion engine are coupled to a transmission input shaft of the transmission arrangement by way of a spur gear train, wherein the spur gear train comprises a first gearwheel, which is fixedly connected to the transmission input shaft and which meshes with a second gearwheel assigned to the electric machine and with a third gearwheel assigned to the internal combustion engine.

2. Hybrid drivetrain according to claim 1, wherein a crankshaft of the internal combustion engine is coupled to the third gearwheel by way of a coupling device.

3. Hybrid drivetrain according to claim 2, wherein the coupling device is formed by a free-wheel.

4. Hybrid drivetrain according to claim 1, wherein the electric machine is arranged coaxially with one of the drive shafts.

5. Hybrid drivetrain according to claim 1, wherein a motor shaft of the electric machine is fixedly connected to the second gearwheel.

6. Hybrid drivetrain according to claim 1, wherein a first idler and a second idler, which can be shifted by way of respective clutches, are rotatably supported on the transmission input shaft.

7. Hybrid drivetrain according to claim 6, wherein the clutches are embodied as power-shift clutches.

8. Hybrid drivetrain according to claim 6, wherein an input element of the differential is fixedly connected to a first driving gear and a second driving gear, which mesh with the first idler and the second idler, respectively.

9. Hybrid drivetrain for a motor vehicle, having
an internal combustion engine;
an electric machine;
a transmission arrangement for setting at least two different gears, the internal combustion engine and the electric machine being coupled to an input element of the transmission arrangement, wherein a first idler and a second idler, which can be shifted by way of respective clutches, are rotatably supported on the transmission input shaft; and
wherein the electric machine and the internal combustion engine are coupled to a transmission input shaft of the transmission arrangement by way of a spur gear train, wherein the spur gear train comprises a first gearwheel, which is fixedly connected to the transmission input shaft and which meshes with a second gearwheel assigned to the electric machine and with a third gearwheel assigned to the internal combustion engine.

10. Hybrid drivetrain according to claim 9, wherein a crankshaft of the internal combustion engine is coupled to the third gearwheel by way of a coupling device.

11. Hybrid drivetrain according to claim 10, wherein the coupling device is formed by a one-way clutch.

12. Hybrid drivetrain according to claim 9, wherein a differential is coupled to an output of the transmission arrangement and is adapted to distribute motive power to two drive shafts, wherein the electric machine is arranged coaxially with one of the drive shafts.

13. Hybrid drivetrain according to claim 9, wherein a motor shaft of the electric machine is fixedly connected to the second gearwheel.

14. Hybrid drivetrain according to claim 9, wherein the clutches are embodied as power-shift clutches.

15. Hybrid drivetrain according to claim 9, wherein an input element of the differential is fixedly connected to a first driving gear and a second driving gear, which mesh with the first idler and the second idler, respectively.

16. Hybrid drivetrain for a motor vehicle, having
an internal combustion engine;
an electric machine;

a transmission arrangement for setting at least two different gears, the internal combustion engine and the electric machine being coupled to an input element of the transmission arrangement; and a differential, which is coupled to an output of the transmission arrangement and which is adapted to distribute motive power to two drive shafts, wherein the electric machine and the internal combustion engine are coupled to a transmission input shaft of the transmission arrangement by way of a spur gear train, wherein a first idler and a second idler, which can be shifted by way of respective clutches, are rotatably supported on the transmission input shaft, and wherein an input element of the differential is fixedly connected to a first driving gear and a second driving gear, which mesh with the first idler and the second idler, respectively.

17. Hybrid drivetrain according to claim 16, wherein the clutches are embodied as power-shift clutches.

18. Hybrid drivetrain for a motor vehicle, having
an internal combustion engine;
an electric machine;
a transmission arrangement for setting at least two different gears, the internal combustion engine and the electric machine being coupled to an input element of the transmission arrangement, wherein a first idler and a second idler, which can be shifted by way of respective clutches, are rotatably supported on the transmission input shaft; and wherein the electric machine and the internal combustion engine are coupled to a transmission input shaft of the transmission arrangement by way of a spur gear train, wherein an input element of the differential is fixedly connected to a first driving gear and a second driving gear, which mesh with the first idler and the second idler, respectively.

19. Hybrid drivetrain according to claim 18, wherein the spur gear train comprises a first gearwheel, which is fixedly connected to the transmission input shaft and which meshes with a second gearwheel assigned to the electric machine and with a third gearwheel assigned to the internal combustion engine.

20. Hybrid drivetrain according to claim 19, wherein a crankshaft of the internal combustion engine is coupled to the third gearwheel by way of a coupling device.

21. Hybrid drivetrain according to claim 18, wherein a differential is coupled to an output of the transmission arrangement and is adapted to distribute motive power to two drive shafts, wherein the electric machine is arranged coaxially with one of the drive shafts.

22. Hybrid drivetrain according to claim 19, wherein a motor shaft of the electric machine is fixedly connected to the second gearwheel.

23. Hybrid drivetrain according to claim 18, wherein the clutches are embodied as power-shift clutches.

* * * * *